(12) United States Patent
Lambert et al.

(10) Patent No.: US 11,669,336 B2
(45) Date of Patent: Jun. 6, 2023

(54) OUT-OF-BAND CUSTOM BASEBOARD MANAGEMENT CONTROLLER (BMC) FIRMWARE STACK MONITORING SYSTEM AND METHOD

(71) Applicant: Dell Products, L.P., Round Rock, TX (US)

(72) Inventors: Timothy M. Lambert, Austin, TX (US); Eugene David Cho, Austin, TX (US); Akkiah Choudary Maddukuri, Austin, TX (US); Chandrasekhar Mugunda, Austin, TX (US); Arun Muthaiyan, Round Rock, TX (US); Hasnain Shabbir, Round Rock, TX (US); Alaric J. Silveira, Austin, TX (US); Sreeram Veluthakkal, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 96 days.

(21) Appl. No.: 17/346,721

(22) Filed: Jun. 14, 2021

(65) Prior Publication Data

US 2022/0398105 A1    Dec. 15, 2022

(51) Int. Cl.
| | | |
|---|---|---|
| G06F 9/44 | (2018.01) | |
| G06F 9/4401 | (2018.01) | |
| G06F 1/20 | (2006.01) | |
| G06F 11/30 | (2006.01) | |

(52) U.S. Cl.
CPC ............ *G06F 9/4405* (2013.01); *G06F 1/206* (2013.01); *G06F 9/4411* (2013.01); *G06F 11/3055* (2013.01)

(58) Field of Classification Search
CPC ...... G06F 9/4405; G06F 1/206; G06F 9/4411; G06F 11/3055
See application file for complete search history.

(56) References Cited

U.S. PATENT DOCUMENTS

| | | | | |
|---|---|---|---|---|
| 8,046,837 | B2* | 10/2011 | Takashima | G06F 21/80 386/253 |
| 2013/0007428 | A1* | 1/2013 | Khosrowpour | G06Q 30/06 713/1 |
| 2013/0111197 | A1* | 5/2013 | Nadon | G06F 9/451 713/1 |
| 2014/0112370 | A1* | 4/2014 | Hsu | G06F 1/206 374/152 |
| 2016/0012245 | A1* | 1/2016 | Cudak | G06F 21/6218 726/26 |

(Continued)

*Primary Examiner* — Zahid Choudhury
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes executable instructions for monitoring a parameter of one or more of the hardware devices of the IHS when a custom BMC firmware stack is executed on the BMC. The instructions that monitor the parameter are separate and distinct from the instructions of the custom BMC firmware stack. When the parameter exceeds a specified threshold, the instructions are further executed to control the BMC to perform one or more operations to remediate the excessive parameter.

20 Claims, 4 Drawing Sheets

(56) References Cited

U.S. PATENT DOCUMENTS

| | | | | |
|---|---|---|---|---|
| 2016/0147540 A1* | 5/2016 | Chiu | ................... | G06F 13/4282 |
| | | | | 713/2 |
| 2016/0291963 A1* | 10/2016 | Kawamura | ........ | H04N 1/00023 |
| 2017/0061135 A1* | 3/2017 | Ishikawa | ............. | H04L 63/1433 |
| 2017/0357515 A1* | 12/2017 | Bower, III | ............ | G06F 9/4411 |
| 2021/0333850 A1* | 10/2021 | Chang | ................ | G05B 19/4155 |
| 2021/0342169 A1* | 11/2021 | Heinrich | ............. | G06F 9/45508 |

\* cited by examiner

OUT-OF-BAND CUSTOM BASEBOARD MANAGEMENT CONTROLLER (BMC) FIRMWARE STACK MONITORING SYSTEM AND METHOD

FIELD

The present disclosure generally relates to electronics, and, more particularly, to an out-of-band custom baseboard management controller (BMC) firmware stack monitoring system and method.

BACKGROUND

An Information Handling System (IHS) generally refers to any computing system that processes, compiles, stores, and/or communicates information or data for business, personal, or other purposes. Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS.

SUMMARY

According to one embodiment, an Information Handling System (IHS) includes multiple hardware devices, and a baseboard Management Controller (BMC) in communication with the plurality of hardware devices. The BMC includes executable instructions for monitoring a parameter of one or more of the hardware devices of the IHS when a custom BMC firmware stack is executed on the BMC. The instructions that monitor the parameter are separate and distinct from the instructions of the custom BMC firmware stack. When the parameter exceeds a specified threshold, the instructions control the BMC to perform one or more operations to remediate the excessive parameter.

According to another embodiment, a method includes the steps of providing a Baseboard Management Controller (BMC) in communication with a plurality of hardware devices of an information handling system (IHS), and monitoring a parameter of one or more of the hardware devices of the IHS when a custom BMC firmware stack is executed on the BMC. The step of monitoring the parameter is separate and distinct from the steps performed by the custom BMC firmware stack. The method further includes the step of controlling the BMC to perform one or more operations to remediate the excessive parameter when the parameter exceeds a specified threshold.

According to yet another embodiment, a BMC includes computer-readable instructions for monitoring a parameter of one or more of the hardware devices of the IHS when a custom BMC firmware stack is executed on the BMC. The instructions that monitor the parameter are separate and distinct from the instructions of the custom BMC firmware stack. When the parameter exceeds a specified threshold, the instructions control the BMC to perform one or more operations to remediate the excessive parameter.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
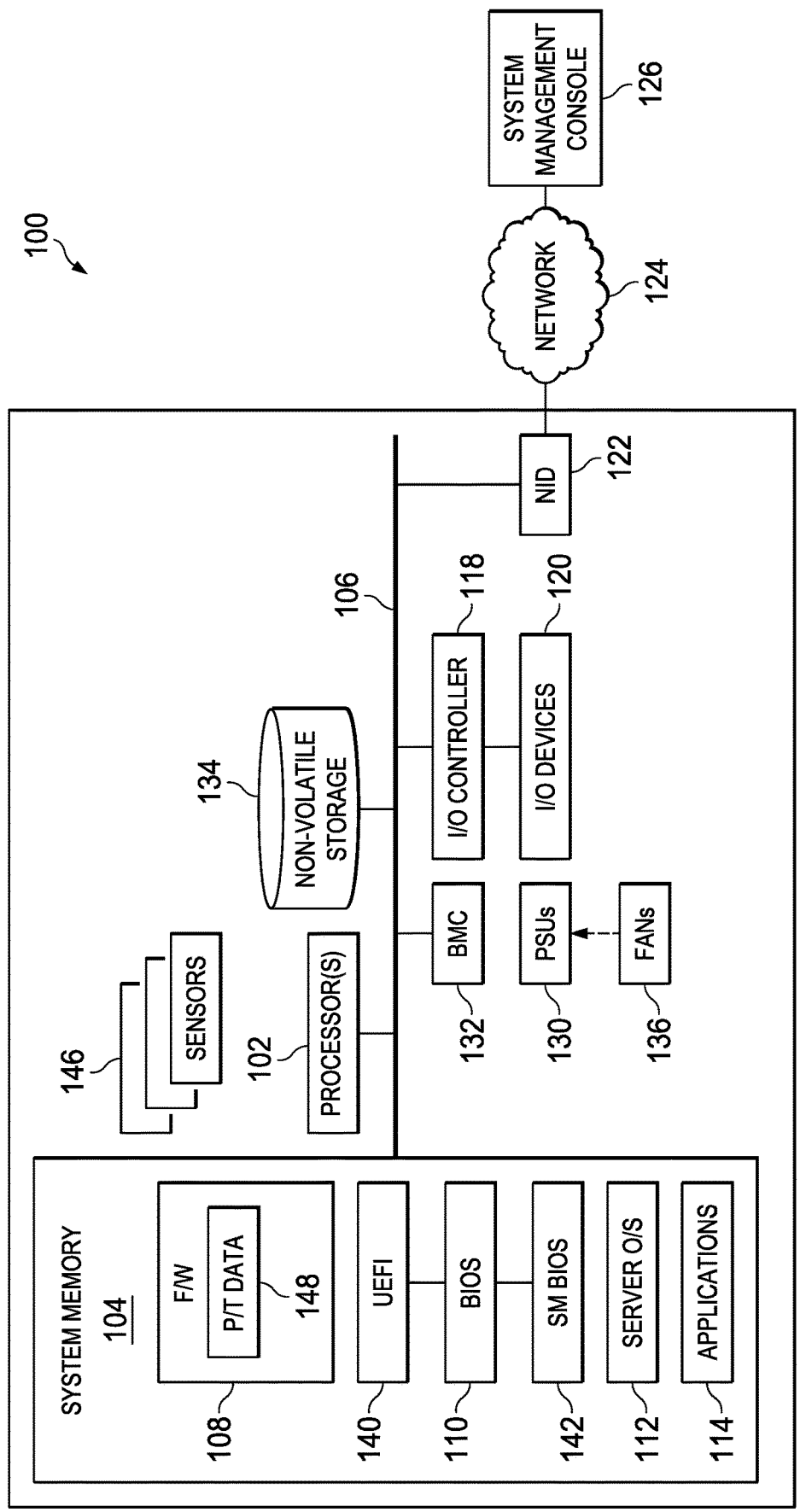
FIG. 1 is a block diagram of examples of components of an Information Handling System (IHS), according to some embodiments.

Embodiments described herein comprise systems and methods for out-of-band monitoring of custom baseboard management controllers (BMCs) that are installed with custom BMC firmware stacks. Whereas custom BMC firmware stacks may be created and implemented with little or no control over how the BMC hardware or its associated IHS may be configured, these custom BMC firmware stacks may exhibit certain problems that, if not resolved, can inflict damage to the IHS or even the BMC hardware itself. Embodiments of the present disclosure provide a solution to this problem, among others, using a system and method that monitors certain parameters of the IHS to determine if certain protection thresholds have been crossed due to use of the custom BMC firmware stack, and if so, perform one or more operations to remediate the exceeded protection thresholds.

Certain IHSs may be configured with BMCs that can be used to monitor, and in some cases manage computer hardware components of those IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

The BMC firmware is normally proprietary and is often developed by the vendor and shipped with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

While custom BMC firmware stacks, such as those implemented according to openBMC standards, may provide enhanced manageability, transparency, and customization, its implementation has not been without drawbacks. For example, whereas standard BMC firmware stacks are often implemented by the vendor of the IHS in which the BMC is deployed, the quality and reliability of the BMC's functionality can be controlled to a relatively good degree. One example of such a standard BMC firmware stack is the iDRAC firmware stack provided by the DELL CORPORATION.

This drawback can be particularly problematic when certain control functions allocated to the BMC can ruin or damage the IHSs if not handled properly. For example, whereas BMCs may be configured to control fan speed of any of a number of fans configured in the IHS, if either inadvertent or malicious algorithms within the custom BMC firmware stack cause the fans to turn excessively slow, the IHS may overheat and, in some extreme cases, suffer physical damage. As another example, modern day BMCs are often configured with eMMC components due to their relatively low cost and small size; nevertheless, excessive read/write cycle rates caused by custom BMC firmware stack algorithms can cause damage to the eMMC components. Embodiments of the present disclosure provide an out-of-band custom BMC firmware stack monitoring system and method that monitors the activities of the IHS as well as a BMC deployed with a custom BMC firmware stack, and provides certain remediation operations should certain protection parameters of the IHS become excessive due to use of the custom BMC firmware stack.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, server operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I$^2$C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
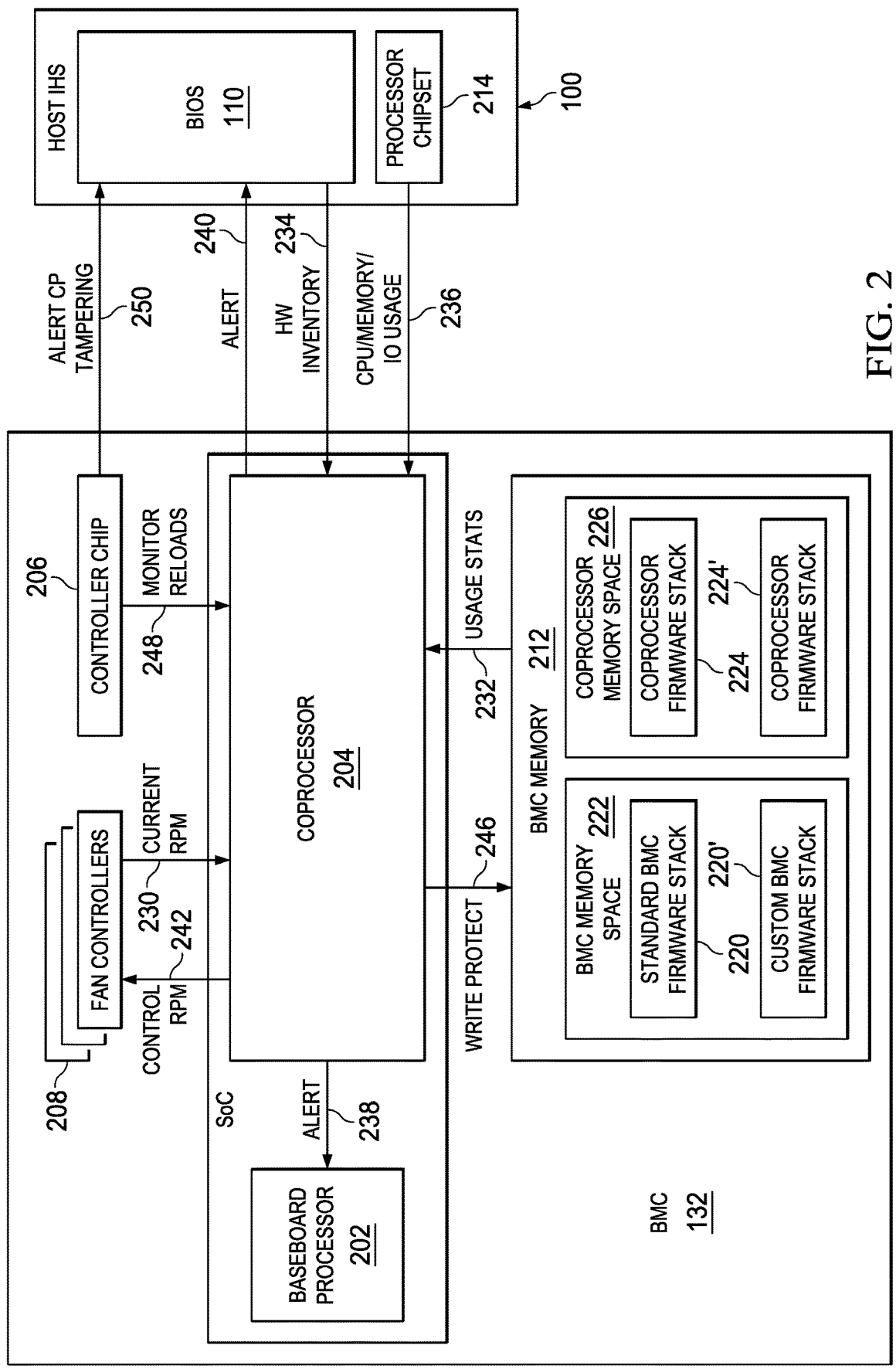
FIG. 2 illustrates several components of an example BMC along with those of an associated IHS showing how those components may signal one another for implementing the custom BMC firmware stack monitoring system according to one embodiment of the present disclosure.

FIG. 2 is a diagram 200 illustrating several components of an example BMC 132 along with those of an associated IHS 100 showing how those components may signal one another for implementing the custom BMC firmware stack monitoring system according to one embodiment of the present disclosure. BMC 132 generally includes a baseboard processor 202, a coprocessor 204, a controller chip 206, one or more fan controllers 208, and a BMC memory 212. The IHS 100 on the other hand, is shown including a BIOS 110, and a processor chipset 214. As shown, the baseboard processor 202 and coprocessor 204 may be provided together in a system on chip device 216. While the BMC 132 and IHS 100 are shown with those components described above for purposes of brevity and clarity of discussion, it should be appreciated that either of the BMC 132 and/or IHS 100 may be configured with additional, fewer, or different components without departing from the spirit and scope of the present disclosure.

Baseboard processor 202 may include any suitable type of processor, such as an advanced RISC machine (ARM) processor. Baseboard processor 202 executes either a standard BMC firmware stack 220 or a custom BMC firmware stack 220' that is stored in a BMC memory space 222. The BMC firmware stack 220 may be, for example, an IHS vendor provided firmware stack (e.g., an iDRAC provided by the DELL CORPORATION), while the custom BMC firmware stack 220' may be one deployed by a user of the IHS, such as one implemented using the openBMC framework. Either BMC firmware stack 220/220' may provide out-of-band monitoring and management of the components of the IHS 100. Examples of monitoring functions that the BMC firmware stack 220/220' may provide include, for example, monitoring internal ambient temperatures and/or voltages in the IHS 100, along with monitoring CPU, memory, and network usage levels, and the like. Examples of management features may include installation of software including the base operating system, of the IHS 100, controlling fan speed of one or more fans in the IHS 100, turning certain components of the IHS 100 on or off, and the like.

Coprocessor 204 executes a coprocessor firmware stack 224/224' that is stored in a coprocessor memory space 226. In one embodiment, the coprocessor memory space 226 is structured to be separate from the BMC memory space 222 so that actions performed by the instructions of the BMC firmware stack 220/220' are not allowed to access and/or do not interfere, either inadvertently or maliciously, with the instructions of the coprocessor firmware stack 224/224'. For example, the BMC memory space 222 may be implemented on a memory device (e.g., an electronic multimedia card (eMMC), an electronic universal flash storage (eUFS), or a low-power double data rate (LPDDR) memory device, etc.) that is discretely separate from another memory device that the coprocessor firmware stack 224/224' is implemented on. As another example, the BMC memory space 222 and coprocessor memory space 226 may be implemented on a single memory device, while the instructions of the BMC firmware stack 220/220' are inhibited from accessing data and executable code from the coprocessor memory space 226 using known memory access blocking techniques. In some cases, the coprocessor firmware stack 224' may include instructions for configuring those memory access blocking techniques for restricting access to the coprocessor memory space 226 by the BMC firmware stack 220.

Custom BMC firmware stacks 220' are typically created by users whose development efforts are not closely controlled by the vendor of the IHS 100 and as such, it may include logic that may not be aware of all of the intricacies of the IHS 100 it is designed to manage. Thus, the coprocessor 204 may be configured with logic for providing out-of-band monitoring of these custom BMC firmware stacks 220' so that, in the event that it causes certain conditions within the IHS 100 to become dangerous for its proper operation, the coprocessor 204 may generate an alert and/or management signal for remediating the dangerous conditions. The coprocessor 204 may be considered to operate out-of-band with respect to the baseboard processor 202 because the actions of the coprocessor 204 function independently or are not controlled by those of the baseboard processor 202. Thus, the coprocessor firmware stack 224' may provide monitoring capabilities over the baseboard processor 202 regardless of what type of logic that it is implemented with. Throughout this disclosure, the terms 'signal' and 'message' may be used interchangeably to mean any informational mechanism transmitted from one component of the system to another.

The coprocessor firmware stack 224 may be provided in at least two different versions. A first coprocessor firmware stack 224 may comprise a standard variation that is loaded on the coprocessor 204 when a standard BMC firmware stack 220 is loaded on the baseboard processor 202, and a second coprocessor firmware stack 224' that is loaded on the coprocessor 204 when a custom BMC firmware stack 220' (e.g., openBMC-based stack) is loaded. Elements of the second coprocessor firmware stack 224' may be configured to provide certain features of the custom BMC firmware stack monitoring system disclosed herein. In one embodiment, the coprocessor firmware stack 224' may monitor certain operational parameters of the components of the BMC 132 to ensure that protection levels for the IHS 100 are not exceeded, and in particular, to actions that may be performed by the custom BMC firmware stack 220'.

Operational parameters generally refer to measured and/or calculated values (e.g., output voltage, current draw, temperature, data throughput, storage capacity, processing rate (MIPs), etc.) associated with the operation and/or configuration of certain components of the IHS 100 or BMC 132. For example, the coprocessor firmware stack 224' may communicate with one or more fan controllers 208 configured on the BMC 132 to receive a fan speed signal 230 associated with the fans configured in the IHS 100. As another example, the coprocessor firmware stack 224' may communicate with the BMC memory 212 to receive memory usage stats 232 (e.g., memory write rates, memory read rates, remaining storage capacity, etc.). The coprocessor firmware stack 224' may also monitor certain operational parameters of the IHS 100. For example, the coprocessor firmware stack 224' may communicate with the BIOS/UEFI 110/140 of the IHS 100 to receive hardware configuration and/or inventory information 234 associated with the components of the IHS 100. Additionally, the coprocessor firmware stack 224' may communicate with the processor chipset 214 of the IHS 100 to receive CPU, memory, and I/O usage information 236 associated with the IHS processors 102, memory 104, and I/O devices 120 of the IHS 100, respectively.

The coprocessor firmware stack 224' may also include logic for determining, based upon the monitored information, whether or not certain protection parameters of the IHS 100 and/or BMC 132 have been exceeded. Protection parameters generally refer to those parameters of certain components that should be maintained within certain limits in order to not adversely affect its operation or the operation of other components with which it is associated. If those protection parameters are exceeded, the coprocessor firmware stack 224' may generate alerts and/or protection signals to remediate the exceeded protection parameter. An alert generally refers to any signal or message that may be generated for notifying the user or another component of the custom BMC firmware stack monitoring system that a protection parameter has been exceeded.

In one embodiment, if the coprocessor firmware stack 224' determines that a certain protection parameter has exceeded a threshold value, it may send a baseboard processor alert signal 238 to the baseboard processor 202 so that the custom BMC firmware stack 220' on which it is running can perform any corrective action necessary to alleviate the exceeded protection parameter. The coprocessor firmware stack 224' may then generate the baseboard processor alert signal 238 by writing an alert message to a shared memory location in the BMC memory space 222 such that when the custom BMC firmware stack 220' detects the alert message, it can process the message. For example, the custom BMC firmware stack 220' may process the alert message by generating an audible or visible message, such as a pop-up window on the screen of a user interface alerting the user that a particular protection parameter has been exceeded.

In another embodiment, if the coprocessor firmware stack 224' determines that a certain protection parameter has been exceeded, it may generate a BIOS alert message 240 to notify the BIOS 110 of the IHS 100 that the protection parameter has been exceeded. When the BIOS 110 receives such a BIOS alert message 240, it may lock the bootstrap code of the BIOS 110 into a user input mode (e.g., F1/F2) so that user input (e.g., voluntary overriding) of the alert condition is required when the IHS 100 is re-started.

The coprocessor firmware stack 224' may also generate protection signals or messages for manipulating certain components of the IHS 100 or BMC 132 to remediate the exceeded protection parameter. In one embodiment, the coprocessor firmware stack 224' may, using the gathered operational parameters, calculate an estimated fan speed for each of the fans configured in the IHS 100, and compare the calculated fan speed against its actual fan speed.

When the calculated fan speed is greater than the actual fan speed, the coprocessor firmware stack 224' may override the actual fan speed, which is typically set by the custom BMC firmware stack 220', to set the fan at the higher fan speed using an RPM control signal 242. By setting the fan speed to the higher of either that set by the custom BMC firmware stack 220' or the estimated value calculated by the coprocessor firmware stack 224', increases the likelihood that a sufficient amount of cooling level is provided to the IHS 100 in certain embodiments.

In another embodiment, the coprocessor firmware stack 224' restrict write access to the BMC memory 212 if certain memory operations performed by the custom BMC firmware stack 220' become excessive. While current BMC implementations often include certain memory devices (e.g., eMMC, eUFS, LPDDR, etc.) due to their relatively small package sized, low cost, and high availability, its memory can become corrupted or even the memory device itself damaged if it is subjected to abnormal use by the custom BMC firmware stack 220', such as by performing an excessive level of write cycles (e.g., write rates) to the BMC memory 212. As such, the coprocessor firmware stack 224' may continually monitor the memory usage stats signal 232 to detect for such conditions and if detected, it may control the BMC memory 212 to restrict its ability to be written to. In some embodiments, the coprocessor firmware stack 224' may also include logic for notifying the user of such a condition, and/or selectively limiting (e.g., throttling) write cycles to the BMC memory 212 by generating a write protect message 246 to maintain a desired write cycle rate or in some cases, to disallow further write sequences to the BMC memory 212 altogether.

Controller chip 206 includes logic for controlling certain features of the IHS 100 and/or BMC 132. In one embodiment, a Complex Programmable Logic Device (CPLD) can be used to implement the controller chip. For example, the controller chip 206 may include logic for, in response to receiving certain input signals, activating or deactivating one or more signals or messages to the baseboard processor 202 and/or coprocessor 204. As another example, the controller chip 206 may include logic for disabling the baseboard processor 202 or coprocessor 204 by holding it in reset so that it cannot boot.

In one embodiment, the controller chip 206 includes logic for monitoring reboots performed by the coprocessor 204. When the baseboard processor is running a custom BMC firmware stack 220', it would be beneficial to inhibit the custom BMC firmware stack 220 from hindering the coprocessor 204 from performing its duties. For example, when a custom BMC firmware stack 220' is loaded on the baseboard processor 202, the controller chip 206 may recognize this condition and in response, inhibit the ability of the custom BMC firmware stack 220' from resetting or accessing the memory, state, and/or configuration of the coprocessor 204. Because rebooting of the coprocessor firmware stack 224' may inadvertently occur for several reasons (e.g., when the IHS 100 is rebooted), the controller chip 206 may receive a coprocessor reload signal 248 from the coprocessor 204 each time it is rebooted. Nevertheless, illegitimate (either malicious or inadvertent) logic may still exist in the custom BMC firmware stack 220' that causes the coprocessor 204 to be illicitly rebooted. The controller chip 206 may be configured with logic to detect when such an illicit reboot of the coprocessor 204 has been encountered, and if so, generate a coprocessor tampering alert message 250 that is sent to the BIOS/UEFI 110/140 of the IHS 100. Accordingly, the BIOS 110 may lock itself in a user input mode, such as described above in response to receipt of the coprocessor tampering alert message 250.

Figure 3:
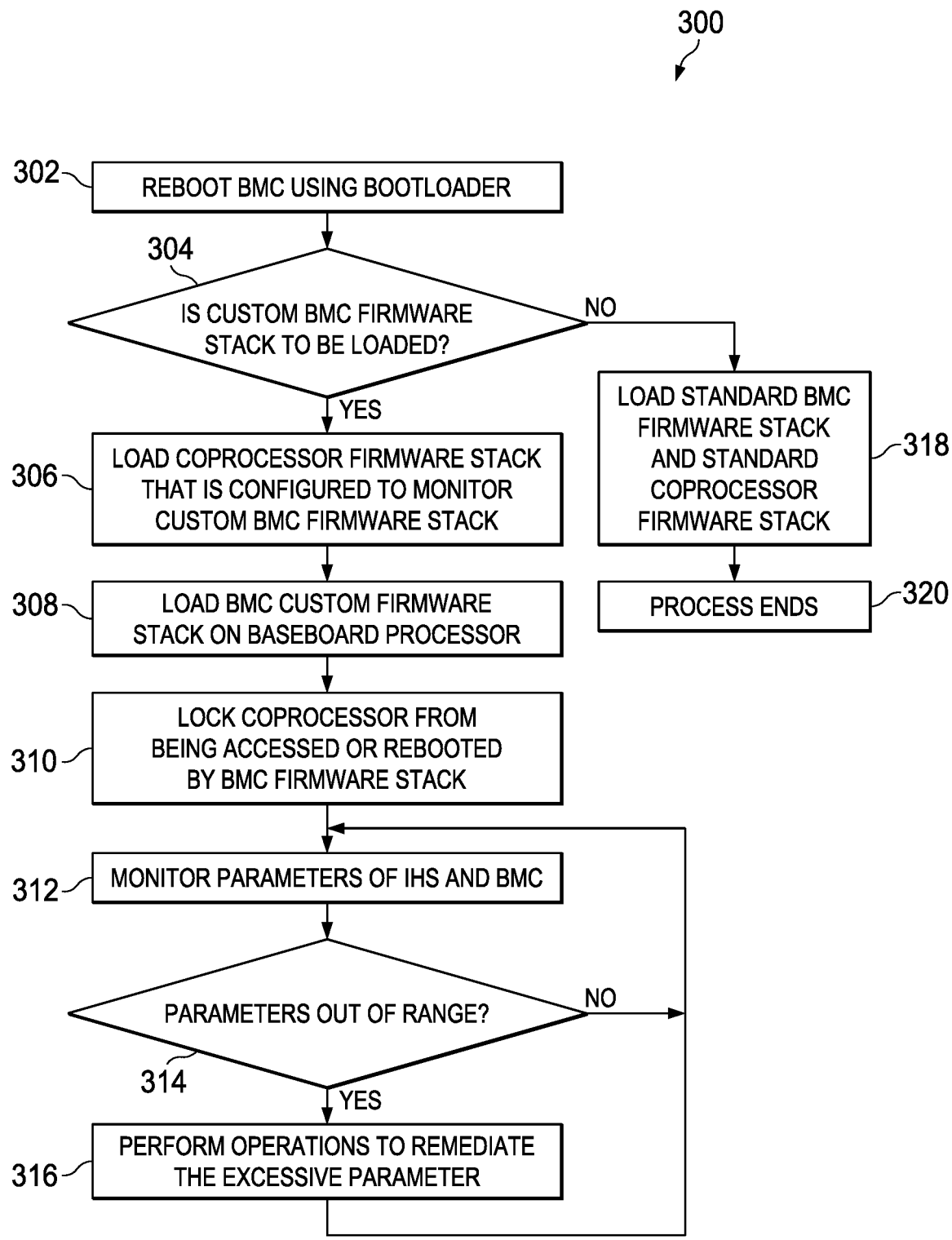
FIG. 3 illustrates an example custom BMC firmware stack monitoring method that may be performed to monitor the operation of a custom BMC firmware stack that is loaded and executed on a BMC according to one embodiment of the present disclosure.

FIG. 3 illustrates an example custom BMC firmware stack monitoring method 300 that may be performed to monitor the operation of a custom BMC firmware stack 220' that is loaded and executed on a BMC 132 according to one embodiment of the present disclosure. The method 300 may be performed at any suitable time. In one embodiment, the method 300 may be performed when the IHS 100 and the BMC 132 are booted. In one embodiment, the method 300 may be performed when only the BMC 132 is re-booted on the IHS 100. The method 300 may be performed in whole, or at least in part, by the coprocessor firmware stack 224', and in particular, a version of the coprocessor firmware stack 224' that is loaded in response to detecting a custom BMC firmware stack 220' being loaded into the baseboard processor 202.

At step 302, the BMC 132 is booted using a suitable bootloader, such as a Universal boot loader (Das U-Boot), which is provided under an open source license, and is primarily adapted for use in embedded processor devices to bootstrap the BMC firmware stack's operating system's kernel. At step 304, the bootloader determines whether the firmware stack to be loaded is a custom BMC firmware stack

220. If not, processing continues at step 318 to load a standard BMC firmware stack 220, and a standard coprocessor firmware stack 224, and finally at step 320 in which the process 300 ends. Nevertheless, if the firmware stack to be loaded is a custom BMC firmware stack 220' (e.g., openBMC-based firmware stack), processing continues at step 306.

At step 306, the bootloader loads the coprocessor firmware stack 224', and at step 308, the bootloader loads the custom BMC firmware stack 220' on the baseboard processor 202. At step 310, the coprocessor 204 is locked from being accessed or rebooted by the custom BMC firmware stack 220'. The coprocessor 204 may be locked in any suitable manner. In one embodiment, when the method 300 is initially started, it may arbitrate for sharing certain resources with the custom BMC firmware stack 220' using a remote processor messaging (RPMSG) protocol. For example, the method 300 may provide for inhibiting some, most, or all of the ability to access the memory contents, state, and/or configuration of the coprocessor 204 with the exception of certain signals provided to the coprocessor 204 as described above with reference to FIG. 2.

At step 312, the method 300 commences monitoring of certain parameters of the IHS 100 and BMC 132. The monitored parameters may include any type that provides information about the performance level of certain components as well as any critical levels that if exceeded, may cause those components to not function properly or even cause damage to those components. In some embodiments, the coprocessor 204 may include logic for calculating certain additional parameters from certain parameters acquired from the IHS 100 or BMC 132. Additional details associated with how the coprocessor 204 obtains and processes received parameters will be described in detail below with reference to FIG. 4.

At step 314, the method 300 determines whether any acquired parameters or calculated parameters have exceeded a specified threshold. For example, the method 300 may compare a parameter against a specified threshold value, and if that parameter exceeds the specified threshold value, then the parameter has been deemed to be out of range. If so, processing continues at step 316; otherwise processing continues at step 312 to continue monitoring of the IHS 100 and BMC 132.

At step 316, the method 300 performs one or more operations to remediate the excessive parameter. In one embodiment, the method 300 may generate an alert signal or message, such as one in which alert information is stored in a shared memory portion of the BMC 132 so that the custom BMC firmware stack 220' can receive and process the alert information. In another embodiment, the method 300 may remediate the excessive parameter by controlling certain components of the IHS 100 or BMC 132. For example, the method 300 may generate an RPM control message 242 for controlling the fan speed of a fan, generate a write protect message 246 for setting access and/or write limits on the BMC memory 212, or generating a BIOS alert message 234 for communicating with the BIOS 110 of the IHS 100 to lock the IHS 100 in a user input mode.

Following remediation of the excessive parameter, the method 300 continues processing at step 312 for ongoing monitoring of the parameters of the IHS 100 and BMC 132. Nevertheless, when use of the method 300 is no longer needed or desired, the method 300 ends.

Although FIG. 3 describes one example of a method that may be performed for continual monitoring of the health of the IHS 100 and BMC 132 when a custom BMC firmware stack 220' is loaded on a BMC 132, the features of the disclosed process may be embodied in other specific forms without deviating from the spirit and scope of the present disclosure. For example, the method 300 may perform additional, fewer, or different operations than those operations as described in the present example. As another example, certain steps of the aforedescribed process may be performed by other components of the BMC 132 and/or IHS 100, such as by the controller chip 206 configured on the BMC 132, or by the BIOS 110 executed on the IHS 100.

Figure 4:
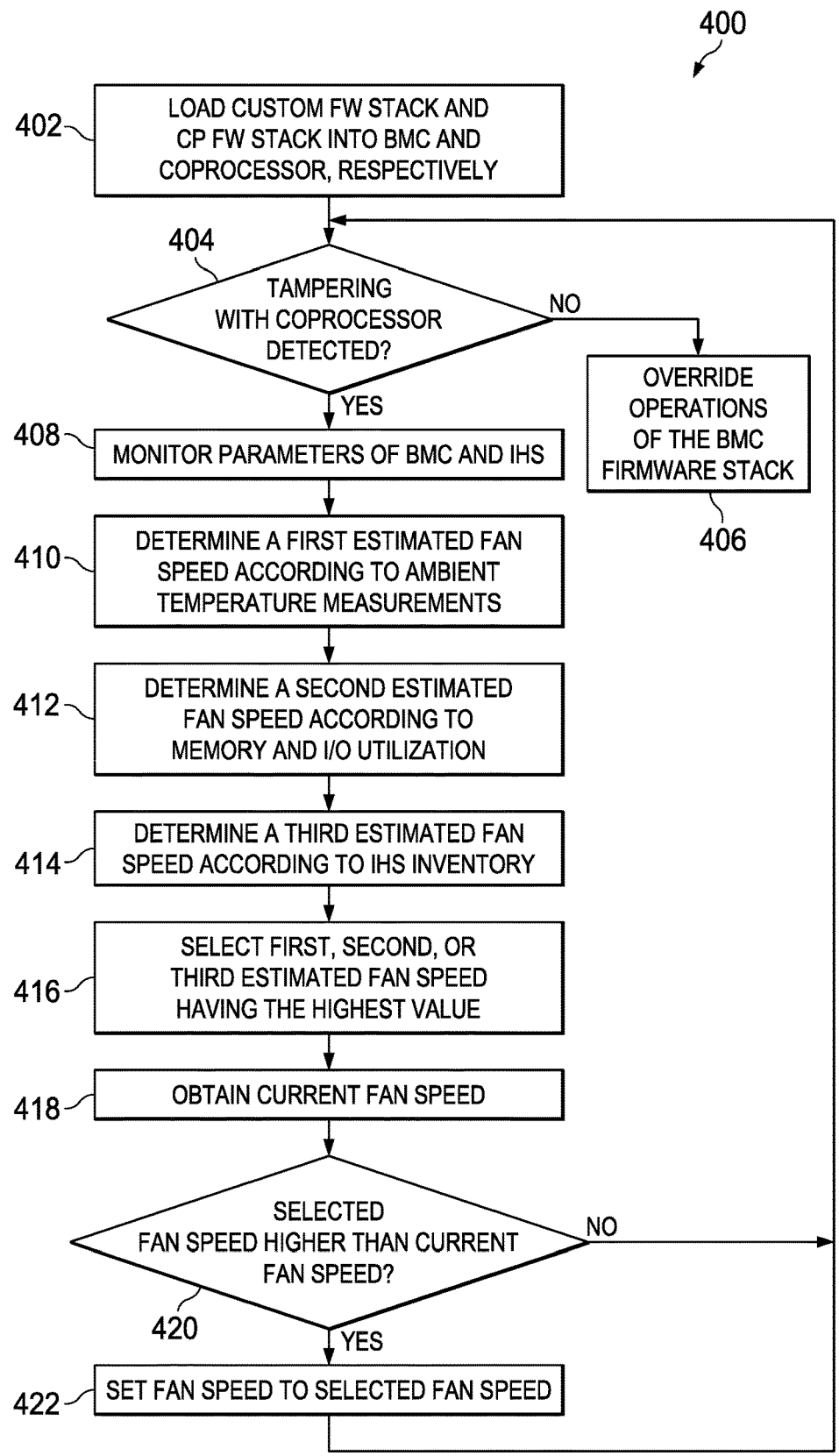
FIG. 4 illustrates an example parameter monitoring method that may be performed by the custom BMC firmware stack monitoring system according to one embodiment of the present disclosure.

FIG. 4 illustrates an example parameter monitoring method 400 that may be performed by the custom BMC firmware stack monitoring system according to one embodiment of the present disclosure. The method 400 may be performed in whole, or at least in part, by the controller chip 206 and/or coprocessor firmware stack 224', and in particular, the coprocessor firmware stack 224' that is loaded in response to detecting a custom BMC firmware stack 220' being loaded onto the baseboard processor 202. Initially, the method 400 may comprise certain actions that are performed as described above with reference to step 316 of FIG. 3.

At step 402, the coprocessor firmware stack 224' is loaded and started when a custom BMC firmware stack 220' is loaded on the BMC 132. Thereafter at step 404, as the custom BMC firmware stack 220' is being executed on the baseboard processor 202, the controller chip 206 determines whether or not the coprocessor 204 has been tampered with. For example, the controller chip 206 may determine that the coprocessor 204 has been tampered with when the coprocessor 204 undergoes an ill-timed reset, or when another process, such as the custom BMC firmware stack 220' attempts to access the coprocessor memory space 226 or attempts to control or modify some part of the coprocessor 204. If so, processing continues at step 406; otherwise, processing continues at step 408.

At step 406, the controller chip 206 performs one or more operations to override the operation of the custom BMC firmware stack 220'. That is, the controller chip 206 effectively seizes control over the operation of the BMC 132 when it detects that the coprocessor 204 has been compromised. For example, the controller chip 206 may communicate with the fan controllers 208 to set the fans at maximum speed to reduce any chance of overheating due to any malicious activity that may be occurring to the IHS 100. As another example, the controller chip 206 may inhibit the custom BMC firmware stack 220' from any further processing, such as by holding the BMC 132 in reset.

Step 408 is performed in the event that no tampering has been detected by the controller chip 206. At step 408, the method 400 monitors the parameters of the BMC 132 and/or IHS 100. For example, the coprocessor 204 may receive operational parameters associated with a temperature of various components of the IHS 100 using a distributed temperature sensing systems (DTS) that measures temperatures using optical fibers functioning as linear sensors, processor and/or memory usage levels using a system monitor executed on the IHS 100, and I/O operational parameters using network controller configured in the IHS 100, among others.

Steps 410-422 described herein below provide a means of overriding the fan speed of the fans of the IHS 100 in the event that the custom BMC firmware stack 220' sets the fan speed at an insufficient level. The custom BMC firmware stack 220' ordinarily possesses the ability to adjust the fan speed of the fans of the IHS 100; however, the custom BMC firmware stack 220' may possess certain flaws (e.g., bugs) that improperly sets the fan speeds at an insufficient level such that, if no intervention is provided, causes the IHS 100 to cease operating properly or even become overheated.

At step 410, the method 400 determines a first estimated fan speed according to ambient temperature measurements. For example, the coprocessor firmware stack 224' may read the CPU DTS measurements through the serial platform environment control interface (PECI) and calculate the first estimated fan speed using the received temperature measurements. At step 412, the method 400 determines a second estimated fan speed according to memory and I/O utilization. For example, the coprocessor firmware stack 224' may obtain memory and I/O utilization through the PECI and calculate the second estimated fan speed based on a characterized curve. At step 414, the method 400 determines a third estimated fan speed according to the IHS's inventory. For example, the BIOS 110 may possess logic for obtaining an inventory of some, most, or all components (e.g., CPU, hard disk drive(s), memory, network controller cards, peripheral devices, etc.) along with additional logic to determine, according to the inventory, a cumulative amount of heat that the components identified by the inventory may generate during usage. The BIOS 110 may then, using the determined cumulative amount of heat generation, select a tier number that ranges from 1 to 20 in which tier 1 represents the lowest heat generation, and 20 represent the highest level of heat generation. The coprocessor firmware stack 224' may receive this tier level number from the BIOS 110, and select the third estimated fan speed based on this tier number.

At step 416, the method 400 selects the first, second, or third estimated fan speed having the highest value. Whereas the drawbacks of having a fan speed that is too high only results in lower power efficiency, the drawbacks of having a fan speed that is too low can often result in damage to the components of the IHS 100. Additionally, by providing multiple estimated fan speed values (e.g., first, second, and third estimated fan speed values), reliability is increased due to the ability to reject outlier values that can, and often do, occur with any value estimation system.

At step 418, the method 400 obtains the current fan speed that the fans in the IHS 100 are operating at. For example, the coprocessor firmware stack 224' may communicate with the fan controllers 208 to obtain the current fan speed of each of the fans in the IHS 100. Thereafter at step 420, the method 400 determines whether the selected fan speed is higher than current fan speed. If not, the fan speed is not adjusted and processing continues at step 404; otherwise, processing continues at step 422. At step 422, the method 400 sets the fan speed of the fans to the estimated fan speed selected at step 416. For example, the coprocessor firmware stack 224' may communicate with the fan controllers 208 to set each of the fans in the IHS 100 to the selected fan speed.

The method 400 described is repeatedly performed throughout the usage of the custom BMC firmware stack 220' on the BMC 132. Nevertheless, when use of the process 400 is no longer needed or desired, the process 400 ends at step 420.

Although FIG. 4 describes one example of a process that may be performed to monitor the BMC 132 during use of a custom BMC firmware stack 220', the features of the disclosed process may be embodied in other specific forms without deviating from the spirit and scope of the present disclosure. For example, the method 400 may perform additional, fewer, or different operations than those described in the present example. As another example, although the method 400 described calculating three estimated fan speeds based on ambient temperature measurements, memory and I/O utilization, and IHS inventory, it is contemplated that only a subset of these techniques may be used to calculate estimated fan speeds, or that other additional factors not necessarily described herein may be used to calculate other estimated fan speeds from which a final estimated fan speed may be selected.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:
1. An Information Handling System (IHS), comprising:
a plurality of hardware devices; and
a Baseboard Management Controller (BMC) in communication with the plurality of hardware devices, the BMC comprising:
a first processor in communication with a first memory unit; and
a second memory unit storing instructions that are executable by a second processor to:
detect whether a standard BMC firmware stack or a custom BMC firmware stack is executed on the first processor, wherein the custom BMC firmware stack has been implemented by an entity that is separate and distinct from a vendor of the IHS;

when the custom BMC firmware stack is executed on the first processor, monitor a parameter of one or more of the hardware devices of the IHS; and when the parameter exceeds a specified threshold, perform one or more operations to remediate the excessive parameter.

2. The IHS of claim 1, wherein the instructions are further executed to detect when the custom BMC firmware stack is booted on the first processor, and commence monitoring of the parameter in response to the detection.

3. The IHS of claim 1, wherein the first processor comprises a baseboard processor and the second processor comprises a coprocessor in communication with the baseboard processor.

4. The IHS of claim 3, wherein the instructions are further executed to perform at least one of restricting access to the second memory unit used by the first processor, and restricting control over the coprocessor by the custom BMC firmware stack.

5. The IHS of claim 1, wherein the instructions are further executed to remediate the excessive parameter by controlling a fan speed of one or more fans configured in the IHS.

6. The IHS of claim 5, wherein the instructions are further executed to:
acquire one or more additional parameters of one or more of the hardware devices;
calculate a desired fan speed setting according to one or more of the acquired parameters; and
set the fan at the desired fan speed.

7. The IHS of claim 6, wherein the instructions are further executed to set the fan at the desired fan speed only when the desired fan speed is greater than the current fan speed.

8. The IHS of claim 1, wherein the instructions are further executed to remediate the excessive parameter by controlling access to a memory storage component of the BMC by the custom BMC firmware stack, wherein the memory storage component comprises the first and second memory units.

9. The IHS of claim 8, wherein the memory storage component comprises at least one of an electronic multimedia card (eMMC), an electronic universal flash storage (eUFS), or a low-power double data rate (LPDDR) memory device.

10. The IHS of claim 1, wherein the instructions are further executed to remediate the excessive parameter by locking the BIOS of the IHS in a user input mode.

11. The IHS of claim 1, wherein the instructions are further executed to remediate the excessive parameter by writing a warning message to a shared memory location of the BMC, wherein the custom BMC firmware stack is configured to read the warning message from the shared memory location and display the warning message for view by a user.

12. A method comprising:
providing Baseboard Management Controller (BMC) in communication with a plurality of hardware devices of an information handling system (IHS);
when a custom BMC firmware stack is executed on a first processor of the BMC, monitoring, by a second processor of the BMC, a parameter of one or more of the hardware devices of the IHS, wherein the instructions that monitor the parameter are separate and distinct from the instructions of the custom BMC firmware stack, and wherein the custom BMC firmware stack has been implemented by an entity that is separate and distinct from a vendor of the IHS; and
when the parameter exceeds a specified threshold, controlling, by the second processor, the BMC to perform one or more operations to remediate the excessive parameter.

13. The method of claim 12, further comprising performing at least one of restricting access to the memory units used by the coprocessor, and restricting control over the coprocessor by the custom BMC firmware stack.

14. The method of claim 12, further comprising remediating the excessive parameter by controlling a fan speed of one or more fans configured in the IHS.

15. The method of claim 14, further comprising:
acquiring one or more additional parameters of one or more of the hardware devices;
calculating a desired fan speed setting according to one or more of the acquired parameters; and
setting the fan at the desired fan speed only when the desired fan speed is greater than the current fan speed.

16. The method of claim 12, further comprising controlling access to a memory storage component of the BMC by the custom BMC firmware stack.

17. The method of claim 12, further comprising remediating the excessive parameter by locking the BIOS of the IHS in a user input mode.

18. The method of claim 12, further comprising remediating the excessive parameter by writing a warning message to a shared memory location of the BMC, wherein the custom BMC firmware stack is configured to read the warning message from the shared memory location and display the warning message for view by a user.

19. A hardware memory device having program instructions stored thereon that, upon execution by a baseboard Management Controller (BMC) of an Information Handling System (IHS), cause the BMC to:
when a custom BMC firmware stack is executed on the BMC, monitor a parameter of one or more of a plurality of hardware devices of an information handling system (IHS), wherein the instructions that monitor the parameter are separate and distinct from the instructions of the custom BMC firmware stack, and wherein the custom BMC firmware stack has been implemented by an entity that is separate and distinct from a vendor of the IHS; and
when the parameter exceeds a specified threshold, control the BMC to perform one or more operations to remediate the excessive parameter.

20. The hardware memory device of claim 19, wherein the instructions are further executed to remediate the excessive parameter by:
acquiring one or more additional parameters of one or more of the hardware devices;
calculating a desired fan speed setting according to one or more of the acquired parameters; and
setting the fan at the desired fan speed only when the desired fan speed is greater than the current fan speed.

* * * * *